US012690671B2

(12) United States Patent
Klementowicz, III et al.

(10) Patent No.: US 12,690,671 B2
(45) Date of Patent: Jul. 28, 2026

(54) EMERGENCY RESPONSE LOCKER

(71) Applicants: Nicholas Klementowicz, III, Hillsborough, NJ (US); John A. Dapkins, Jr., Pt. Pleasant, NJ (US)

(72) Inventors: Nicholas Klementowicz, III, Hillsborough, NJ (US); John A. Dapkins, Jr., Pt. Pleasant, NJ (US)

( * ) Notice: Subject to any disclaimer, the term of this patent is extended or adjusted under 35 U.S.C. 154(b) by 247 days.

(21) Appl. No.: 18/222,638

(22) Filed: Jul. 17, 2023

(65) Prior Publication Data

US 2025/0024939 A1 Jan. 23, 2025

(51) Int. Cl.
*A47B 47/02* (2006.01)
*A47B 81/00* (2006.01)
*E05B 65/02* (2006.01)

(52) U.S. Cl.
CPC ............ *A47B 47/02* (2013.01); *A47B 81/005* (2013.01); *E05B 65/025* (2013.01)

(58) Field of Classification Search
CPC ...... A47B 47/02; A47B 81/005; E05B 65/025
See application file for complete search history.

(56) References Cited

U.S. PATENT DOCUMENTS 1,654,616 A * 1/1928 Spann .................. A47B 81/005 312/204
3,031,069 A * 4/1962 Hirsch .................... F41C 33/06 211/64
4,099,808 A * 7/1978 Oakley ..................... E05G 1/00 312/297
4,155,608 A * 5/1979 Orlewicz ................ F21V 23/04 109/51
4,304,447 A * 12/1981 Ellwood .................. A47G 1/02 312/227

(Continued)

FOREIGN PATENT DOCUMENTS

CN 208129678 U 11/2018
CN 213046120 U 4/2021

(Continued)

OTHER PUBLICATIONS

Dave Haynes, Digital Display Kiosks Doubles up as Storage Lockers for First Responder Emergency Needs, Nov. 9, 2021; Sixteen:Nine by Dave Haynes—Ref. pp. 3/8.

*Primary Examiner* — Stanton L Krycinski
(74) *Attorney, Agent, or Firm* — Ernest D. Buff, Esq.; Ernest D. Buff & Associates, LLC

(57) ABSTRACT

An emergency response kit comprises an enclosure for storage having an operational front open end and a rear closed end, the enclosure being defined by a base, lateral walls, a back wall, and a rooftop. The kit comprises a door pivoted at said operational front end to one of the lateral walls using an attachment means, which facilitates movement of the door between an open position and a closed position to provide access to an inside of the enclosure. A weather-resistive gasket seals a peripheral edge of said open end of the enclosure. The kit has one or more emergency response equipment secured inside the enclosure to one of said enclosure walls. The emergency response equipment comprises breaching equipment, medical supplies, fire safety equipment, firearms and ballistic shields. The kit further comprises a locking mechanism to restrict access to the emergency response equipment.

3 Claims, 5 Drawing Sheets

(56) References Cited

U.S. PATENT DOCUMENTS

| | | | | |
|---|---|---|---|---|
| 4,309,065 | A * | 1/1982 | Pappas | F41C 33/0209<br>224/912 |
| 5,111,755 | A * | 5/1992 | Rouse | E05G 1/00<br>109/47 |
| 5,118,175 | A * | 6/1992 | Costello | E05G 1/02<br>312/271 |
| 5,388,570 | A * | 2/1995 | Wassil | A61F 17/00<br>128/202.28 |
| 5,772,295 | A * | 6/1998 | Sundmark | A47B 46/005<br>312/246 |
| 6,478,391 | B1 * | 11/2002 | Stoever | A47B 47/02<br>312/265.5 |
| 6,732,787 | B1 * | 5/2004 | Trehan | H05K 7/206<br>165/122 |
| 6,814,932 | B2 * | 11/2004 | Hlebovy | A61L 2/24<br>134/32 |
| 7,118,185 | B2 * | 10/2006 | Mittag | A47B 47/02<br>312/352 |
| 7,478,892 | B2 * | 1/2009 | Punzel | E05C 9/043<br>312/351 |
| 7,524,002 | B2 * | 4/2009 | Punzel | A47B 81/005<br>312/215 |
| 7,699,412 | B2 * | 4/2010 | Heimler | E05C 1/06<br>312/220 |
| 7,814,621 | B1 * | 10/2010 | Radke | E05D 11/1014<br>16/388 |
| 7,877,920 | B2 * | 2/2011 | Szuminski | A47B 81/005<br>109/51 |
| 7,967,400 | B1 * | 6/2011 | Collum | E05C 3/38<br>312/246 |
| 9,192,231 | B1 | 11/2015 | Steffen | |
| 9,198,512 | B1 * | 12/2015 | Moayeri | A47B 81/005 |
| 9,226,577 | B2 * | 1/2016 | Stepp | A47B 81/005 |
| 9,247,811 | B2 * | 2/2016 | Spencer | A47B 96/16 |
| 9,441,409 | B2 * | 9/2016 | Smietana | G07C 9/00674 |
| 9,759,529 | B2 * | 9/2017 | Childs | F41H 9/10 |
| 9,888,771 | B2 * | 2/2018 | Suggs | E05G 1/024 |
| 10,249,177 | B2 | 4/2019 | Powers, III et al. | |
| 10,472,879 | B1 * | 11/2019 | Galler | E05B 53/00 |
| 10,716,397 | B2 * | 7/2020 | Garrett | A47B 88/42 |
| 10,750,860 | B1 * | 8/2020 | Arndt | A47B 81/005 |
| 10,810,846 | B1 * | 10/2020 | Gonzalez | G08B 13/149 |
| 11,131,137 | B2 * | 9/2021 | Hayman | E05B 49/00 |
| 11,385,023 | B1 * | 7/2022 | Hayman | A47B 81/005 |
| 11,566,868 | B2 * | 1/2023 | Mack | F41C 33/06 |
| 11,819,126 | B2 * | 11/2023 | Schofield | E05B 73/00 |
| 2003/0141794 | A1 * | 7/2003 | Cleveland | E05G 1/024<br>312/409 |
| 2004/0140280 | A1 * | 7/2004 | Cleveland | A47B 46/00<br>211/64 |
| 2005/0133473 | A1 * | 6/2005 | Lesperance | A47B 81/005<br>211/64 |
| 2006/0192466 | A1 * | 8/2006 | Flyer | A47B 55/00<br>312/100 |
| 2006/0214770 | A1 * | 9/2006 | Capouch | A47G 29/141<br>340/5.64 |
| 2006/0254796 | A1 * | 11/2006 | Chen | A47B 47/02<br>174/50 |
| 2006/0283820 | A1 * | 12/2006 | Peters | A47B 81/005<br>211/64 |
| 2007/0013478 | A1 * | 1/2007 | Crigger | G07C 9/37<br>70/279.1 |
| 2007/0024165 | A1 * | 2/2007 | Moulton | A47B 81/005<br>312/291 |
| 2007/0170128 | A1 * | 7/2007 | Punzel | A47B 81/005<br>211/64 |
| 2008/0203860 | A1 * | 8/2008 | Myers | A47B 81/005<br>312/204 |
| 2008/0218040 | A1 * | 9/2008 | Punzel | A47B 47/02<br>312/215 |
| 2008/0238277 | A1 * | 10/2008 | Geng | A47B 47/02<br>312/326 |
| 2008/0258869 | A1 * | 10/2008 | Ognjenovic | G07C 9/00896<br>340/5.73 |
| 2009/0230826 | A1 * | 9/2009 | Myers | A47B 81/005<br>312/204 |
| 2012/0012590 | A1 * | 1/2012 | Earp | A47B 81/005<br>220/529 |
| 2012/0206026 | A1 * | 8/2012 | Emelio | E05B 47/004<br>312/204 |
| 2013/0002116 | A1 * | 1/2013 | Lodge | A47B 81/00<br>312/351.1 |
| 2014/0132131 | A1 * | 5/2014 | Thomas | E06B 7/34<br>312/204 |
| 2015/0332528 | A1 * | 11/2015 | McGinnis | E05G 1/00<br>109/23 |
| 2016/0053526 | A1 * | 2/2016 | Dittrich | E05G 1/026<br>109/38 |
| 2018/0110331 | A1 * | 4/2018 | Mack | A47B 47/025 |
| 2018/0140144 | A1 * | 5/2018 | Music | A47K 17/00 |
| 2019/0011222 | A1 * | 1/2019 | Suggs | E05G 1/024 |
| 2019/0387879 | A1 | 12/2019 | Innella et al. | |
| 2022/0076815 | A1 * | 3/2022 | Kenner | A61B 50/00 |
| 2022/0098921 | A1 | 3/2022 | Madden | |

FOREIGN PATENT DOCUMENTS

| | | | | |
|---|---|---|---|---|
| CN | 214855443 | U | 11/2021 | |
| DE | 3420880 | A1 * | 12/1985 | |
| GB | 2459782 | A * | 11/2009 | A47B 1/005 |
| KR | 2012-0048127 | A | 5/2012 | |

* cited by examiner

EMERGENCY RESPONSE LOCKER

BACKGROUND OF THE INVENTION

1. Field Of The Invention

The present invention pertains to a kit that can be employed in an emergency scenario; and, more particularly, to an emergency response locker specially designed to securely accommodate breaching tools, medical supplies, a flashbang, a ballistic shield, and the like for easy access during a mass casualty event.

2. Description Of The Prior Art

It is crucial for law enforcement officers, SWAT teams or first responders to promptly have access to a site that requires effective mitigation and response to mass casualty emergencies or critical incidents. They need to have the necessary breaching, offensive, and defensive tools and resources at their disposal in order to effectively confront certain desperate situations. These necessary tools enable law enforcement officers or responders to protect lives, neutralize threats, and provide life-saving medical care, which is always the highest priority during such scenarios. Without swift access to such tools, the first responders may have to wait for certified personnel with a separate convoy equipped with the required tools to arrive on the scene, which again results in the wastage of precious time, and may result in loss of life and property.

In the past, efforts have been made to address some of the issues that the first responders may have to face. For example, U.S. Pat. No. 10,249,177B2 discloses a system and method for responding to triggering events on premises. It involves accessing a vault compartment on-site to retrieve a responder tool kit that includes a ballistic vest, portable communication device, and defense device.

Similarly, US20190387879A1 describes an emergency response kiosk that serves as an on-site command and control center. The kiosk features a tamper-proof locker box mounted on a pedestal base, with a hinged door and latch mechanism allowing access only to authorized personnel. Strategically positioned at various locations, the kiosk provides decentralized access to vital medical supplies, equipment, and tactical gear for first responders during mass casualty events.

However, conventional emergency response kits are not structured to sustain harsh weather conditions. They deteriorate rapidly and break easily, thus providing access of the critical tools or equipment stored therein to unauthorized personnel.

Accordingly, there remains an unmet need for an emergency response locker that is modular, readily accessed, contains a predefined layout, and yet is secure, sturdy, and easy to use by virtually all trained members from an implementation standpoint. Additionally, there exist issues relating to the customization of such lockers based on tools and equipment required to be stored therein.

SUMMARY OF THE INVENTION

It will be understood that this disclosure is not limited to the particular systems and methodologies described, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

Described herein is an emergency response kit for facilitating a quick safeguarding emergency response. In an embodiment, the emergency response kit comprises an enclosure for storage having an operational front open end and a rear closed end, the enclosure is defined by lateral walls, a base, a back wall, and a rooftop. The kit further comprises a door pivoted at said an operational front end to one of the lateral walls using an attachment means which facilitates movement of the door between an open position and a closed position to selectively provide access to an inside of the enclosure. A weather-resistive gasket is provided to seal a peripheral edge of said open end of the enclosure. The kit further comprises one or more emergency response equipment secured inside of the enclosure to at least one of said base, said rooftop, said back wall, and said lateral walls. The emergency response equipment may include breaching equipment, medical supplies, fire safety equipment, firearms, and one or more ballistic shields. The emergency response kit further comprises a locking mechanism for securing the door in said closed position to restrict access to one or more emergency response equipment.

In an embodiment, the enclosure comprises sections, wherein at least one section is made accessible through a secure access control mechanism.

In an embodiment, the enclosure comprises a stainless steel handle attached to the exterior of the door and a reinforced stainless steel locking mechanism attached to the interior of the locker. The primary purpose of the locking mechanism is security. The locking mechanism prevents or slows access from attempts to gain entry by pulling hard on the handle to open the locker without a key or preselected code. In such a situation, the locking mechanism would cause the handle to break off, leaving the door locked in place but subject to being opened through the use of a key and/or the appropriate code.

In an embodiment, the locking mechanism comprises at least two roller ball catches attached to the interior of the door.

In an embodiment, the locking mechanism comprises at least one of a mechanical key lock, number lock, biometric lock, wireless card access lock, and an eye retina scan lock.

In an embodiment, the kit further comprises an alarm module coupled electromechanically with the locking mechanism and configured to provide an audible alert when the door is accessed using force or any unauthenticated manner.

In an embodiment, one or more emergency response equipment are secured on the inside of the enclosure through a plurality of securing and mounting means.

In an embodiment, the mounting means comprises brackets, tamper-resistant fasteners, and anchor fasteners.

In an embodiment, the kit further comprises labeled decals for ease of identification of the one or more emergency response equipment stored within the enclosure.

In an embodiment, the emergency response kit is a portable kit adapted to be mounted on a wall.

In an embodiment, the enclosure comprises at least one of grooves, slots, and housing on said back wall for holding the emergency response equipment against the wall.

In an embodiment, the enclosure and the door are constructed of cold-rolled galvanized steel.

In an embodiment, the enclosure and the door are constructed of rust-inhibiting phosphate-treated steel material.

In an embodiment, the enclosure is coated with a weather and rust-resistant coating selected from baked red enamel and a black enamel coat.

In an embodiment, the rooftop is sloped at an angle.

BRIEF DESCRIPTION OF THE DRAWINGS

The invention will be more fully understood, and further advantages will become apparent when reference is had to the following detailed description and the accompanying drawings, in which.

DETAILED DESCRIPTION

Some embodiments of this invention, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, and composition of matter, means, methods, and steps described in the specification. As one will readily appreciate from the disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The preceding description has been presented with reference to various embodiments. Persons skilled in the art and technology to which this application pertains will appreciate that alterations and changes in the described structures and methods of operation can be practiced without meaningfully departing from the principle, and scope.

Figure 1:
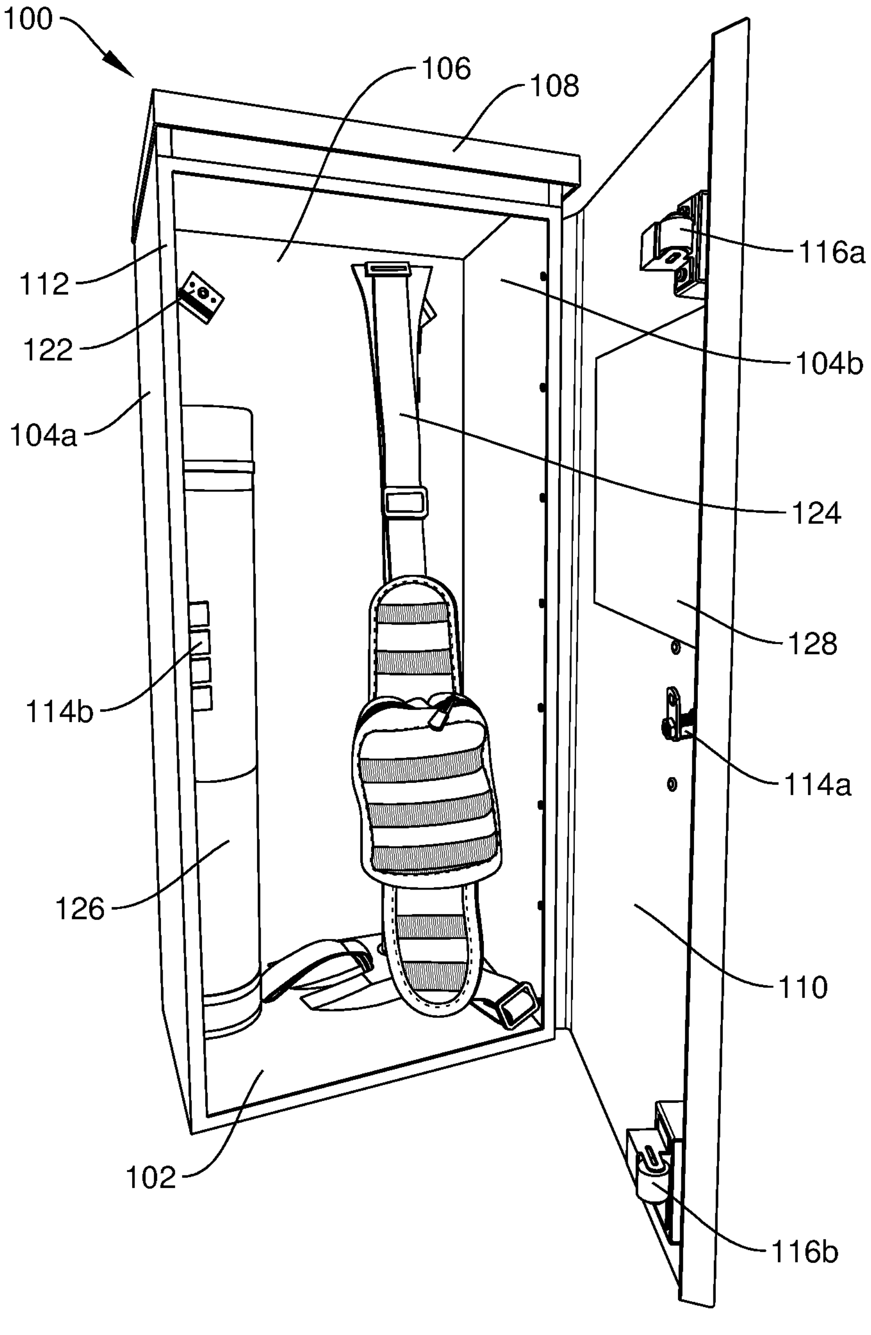
FIG. 1 illustrates a perspective view of an emergency response kit, according to an embodiment of the present invention.

FIG. 1 illustrates a perspective view of an emergency response kit 100, according to an embodiment of the present invention. The emergency response kit 100 comprises an enclosure for storing essential equipment 124, 126. The enclosure has an operational front open end and a rear closed end. The enclosure is defined by a base 102, lateral walls 104*a*, 104*b*, a back wall 106, and a rooftop 108. The enclosure comprises a door 110, which is pivoted at the operational front end to one of the lateral walls 104*a*, 104*b* using, for example, an attachment means, which facilitates movement of door 110 between an open position and a closed position to selectively provide access to an inside of the enclosure. The attachment means may include, for example, a hinge of durable material, such as stainless steel or like. In an embodiment as shown, the attachment means includes a full-length hinge.

In an embodiment, the door of the emergency response kit is equipped with a handle, which is attached to the exterior of door 110. The handle is configured to open and close door 110 to allow easy access to equipment 124 and 126 of kit 100. The handle can be made of a material such as stainless steel or like, which is known for its durability and resistance to corrosion.

In the present embodiment, door 110 is designed as a "bend door" or "recessed door," which incorporates a curved or recessed area extending from lateral edges of the inside surface of door 100 to provide enhanced security for the enclosure. This design makes it more difficult to pry open or tamper with door 100 when door 100 is locked. The depth and shape of the curve can vary, as will be appreciated by a skilled person, depending on the desired level of security. While the bend design in the door 100 adds an extra layer of protection, it is often used in conjunction with some locking mechanisms for a comprehensive security solution.

In an embodiment, door 110 can be made up of rust-inhibiting phosphate-treated steel material, cold-rolled galvanized steel, and or like material that provides durability and resistance to corrosion.

In an embodiment, the emergency response kit 100 includes a weather-resistive gasket 112 attached along a peripheral edge of said operational front open end of the enclosure. The Gasket 112 provides water-proof sealing when door 110 of kit 100 is closed, thus preventing the ingress of water and moisture inside the enclosure. The weather-resistive gasket 112 forms a tight seal between the door 110 and the rest of the kit 100. When door 110 is closed, the weather-resistive gasket 112 creates a barrier that prevents water or moisture from seeping into the enclosure, thereby enhancing the durability of kit 100 and keeping it ready to use in all weather conditions.

Further, kit 100 is provided with a locking mechanism 114 for securing the door in the closed position. Kit 100 can be locked through different types of locking mechanisms 114 such as mechanical key lock, number lock, biometric lock, wireless card access lock, retina scan lock, keyed locks, padlocks, cam locks, combination locks, electronic locks, magnetic locks, sliding door locks or like. The locking mechanism 114, as shown in the present embodiment, includes a lock body 114*a* and a strike plate 114*b*. The lock body 114*a* of the locking mechanism is attached to door 110 such that a latch part of the lock body 114*a* is on the interior of the door, while the lock body 114*a* may be locked through a key from an exterior of door 100. The strike plate 114*b* of the locking mechanism is attached to an interior of any of the lateral walls 104*a*, 104*b*, opposite to a lateral wall where door 110 is pivoted. The locking mechanism 114, as shown, ensures that the enclosure of the emergency response kit 100 can only be accessed easily by an authorized person solely through the key.

Kit 100 further comprises at least two roller ball catches 116*a* and 116*b* attached on an interior surface of door 110. The roller ball catches 116*a* and 116*b* are used to secure door 110 in a closed position. The roller ball catches 116*a* and 116*b* include a catch mechanism and a strike plate (not shown). When door 110 is closed, the rollers on the catch mechanism engage with the strike plates while a spring-loaded ball is pressed inward. To open door 110, the roller disengages from the strike plate as the ball retracts. When door 110 is closed again, the roller rolls over the strike plate, and the spring-loaded ball pops out, securing door 110 in place. The roller ball catches 116*a* and 116*b* offer a simple, safe, and convenient way to keep door 110 in the closed position.

In an embodiment, kit 100 includes an alarm module (not shown in the FIG.) installed within the enclosure of the emergency response kit 100. The alarm module may be coupled electromechanically with the locking mechanism 114. The alarm module may be configured to provide audible alerts whenever door 110 is opened, indicating that the enclosure has been accessed. When door 110 is opened or moved to the open position, the alarm module is triggered to provide audible alerts. The alarm module is useful in drawing attention of concerned persons towards any unauthorized opening or tampering of the kit 100, thereby enhancing its security and prompting immediate actions.

Kit 100 may further include a hidden compartment (not shown in the FIG.) constructed within said enclosure and accessible only through a secure access control mechanism. The secure access control mechanism may provide an additional layer of security to the emergency response equipment stored within kit 100. In an embodiment, the secure access control mechanism can be accessed by biometric, retina scan and or like, thereby ensuring robust security and providing access to authorized personnel only.

As shown in FIG. 1, the emergency response kit 100 can be mounted on the wall, for example, using mounting means 122. In an embodiment, mounting means 122 can be selected from at least one of temper-resistant fasteners, anchor bolts, or similar means to ensure a secure attachment. Therefore, kit 100 provides flexibility in terms of installing it in different environments and orientations. For this purpose, the enclosure may have at least one of grooves, slots, brackets, and housing on said back wall for holding the emergency response equipment against the wall.

In an embodiment, the enclosure, which is an emergency response locker with a roof top having a sloped profile, may securely accommodate one or more emergency response equipment 124. Further, the enclosure may store master maps 126 of the building in which such a kit 100 may be installed. The kit 100 may further include a local jurisdiction map 128 provided within the enclosure. The emergency response equipment 124 may include medical supplies, fire safety equipment, firearms, one or more ballistic shields, a flashbang and the like. A flashbang especially well suited for storage in the emergency response locker is a noncombustible tactical flash device of the type described and claimed by U.S. Pat. No, 9,016,888, the disclosure of which is specifically incorporated herein by reference thereto. In an embodiment, the one or more emergency response equipment may be secured to any one of the base 102, the rooftop 108, the back wall 106, and the lateral walls 104*a*, 104*b*. In an embodiment, the emergency response equipment stored within the enclosure may also be labeled with different decals of color codes for ease of identification. Further, by having this equipment readily available, the authorized personnel can access necessary tools and information quickly, thus enhancing the functionality of the emergency response kit 100.

The emergency response kit 100, as disclosed, may be made of steel to avoid rust while its surfaces may be coated with a weather-resistant and rust-resistant coating. For example, the surfaces of the emergency response kit 100 can be treated with a rust-inhibiting phosphate to make it corrosion-resistant. Further, the surfaces of the enclosure can be layered with weather and rust-resistant coating. The weather and rust-resistant coating may include at least one of baked red enamel or a black enamel coat. Further, weatherproofing of the emergency response kit 100 ensures durability even when the emergency response kit 100 is installed on outdoors, such as on exterior of the building.

Figure 2:
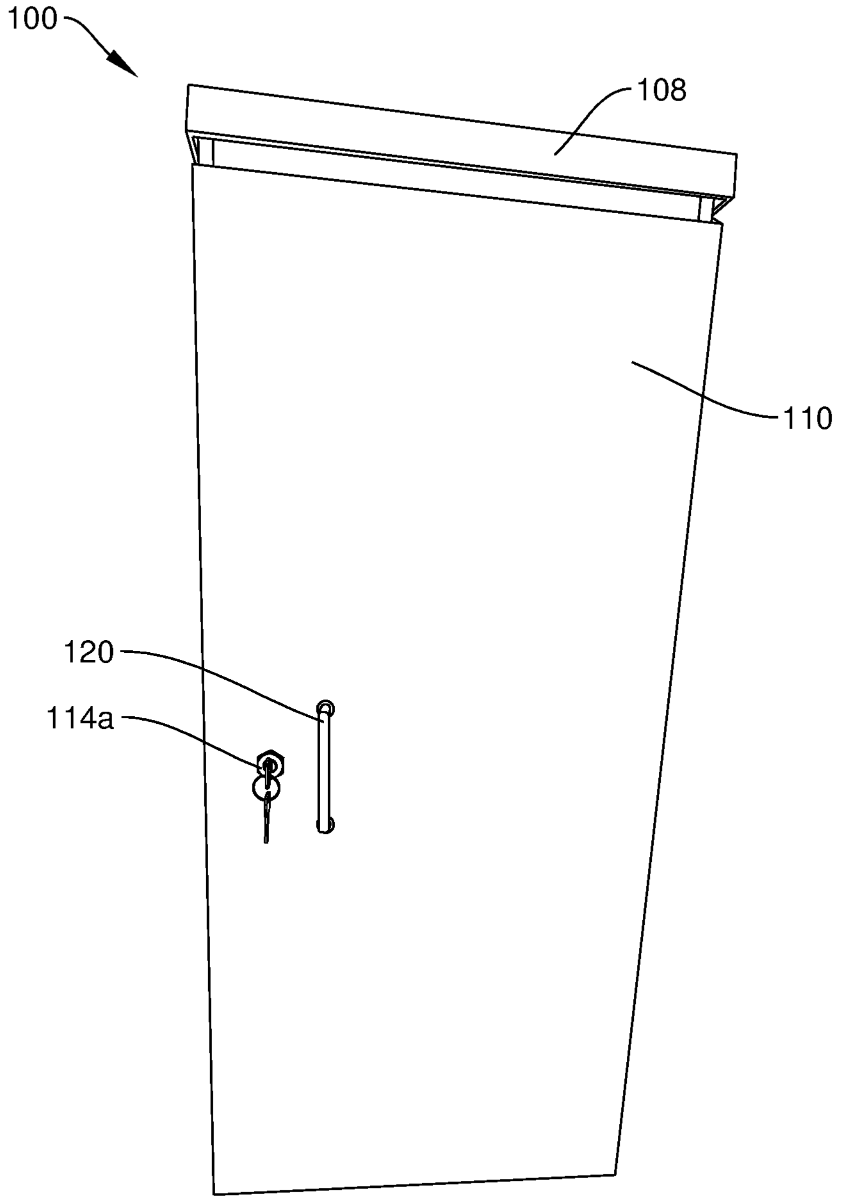
FIG. 2 illustrates another perspective view of an emergency response locker with a door in the closed position, according to an embodiment of the present invention.

FIG. 2 illustrates another perspective view of an emergency response locker with door 110 in the closed position. On the exterior of the door, a handle 120 of durable material, such as stainless steel, is implemented. Further, as shown here, the locking mechanism 114 can be accessed from the exterior to open door 110.

Figure 3:
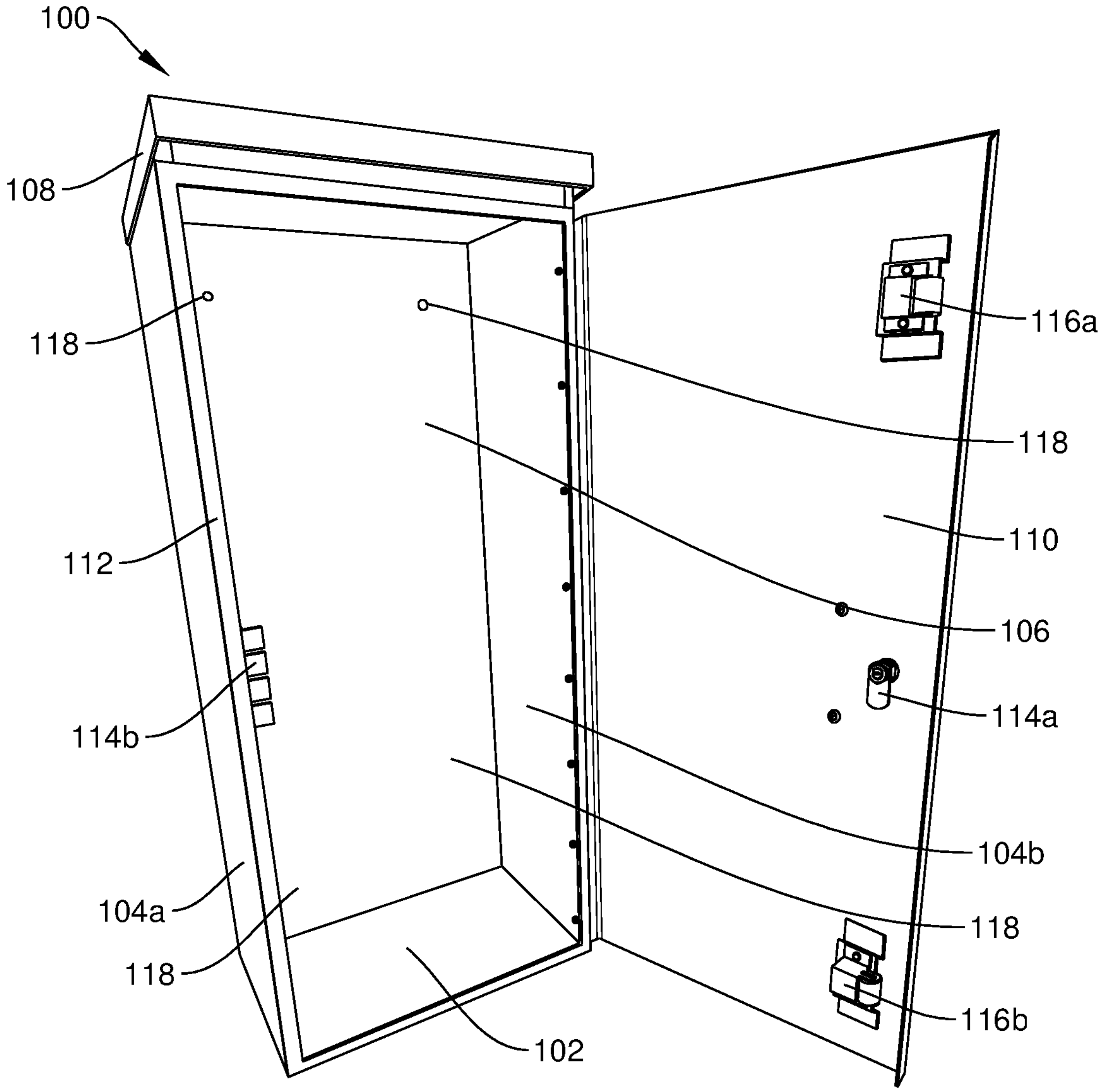
FIG. 3 illustrates a perspective view of the emergency response locker with a door in an opened position, according to an embodiment of the present invention.

FIG. 3 illustrates another perspective view of the emergency response locker with a door in an open position. The enclosure of the emergency response locker includes four evenly spaced apertures 118 on its back wall 106, allowing the emergency response locker to be securely mounted on indoor or outdoor walls.

Figure 4:
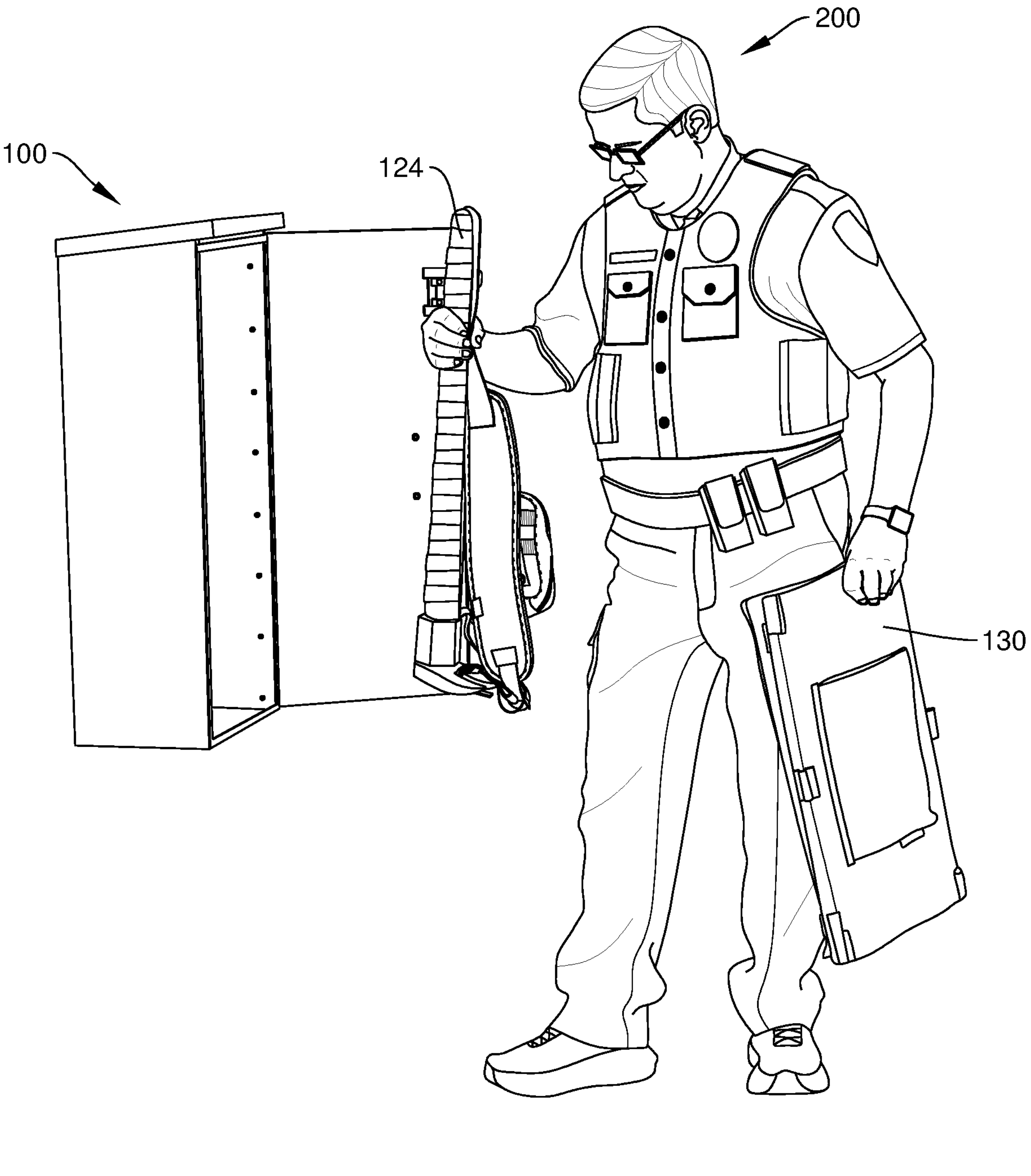
FIG. 4 illustrates a perspective view of the emergency response kit mounted on a wall for use by authorized personnel, according to an embodiment of the present invention.

FIG. 4 illustrates a perspective view of the emergency response kit 100 mounted on a wall for use by authorized personnel 200 in operation. In the emergency situation, the authorized person 200 may access one or more emergency response equipment from the emergency response kit 100 by first unlocking the locking mechanism 114*a*, 114*b*. In FIG. 4, the authorized person 200 is shown accessing the breaching equipment 124 and the ballistic shield 130. An additional emergency response equipment can preferably include a sling such as the "GO Sling" sold by Jersey Tactical Corporation for carrying breaching equipment 124 and, optionally, medical supplies.

Figure 5:
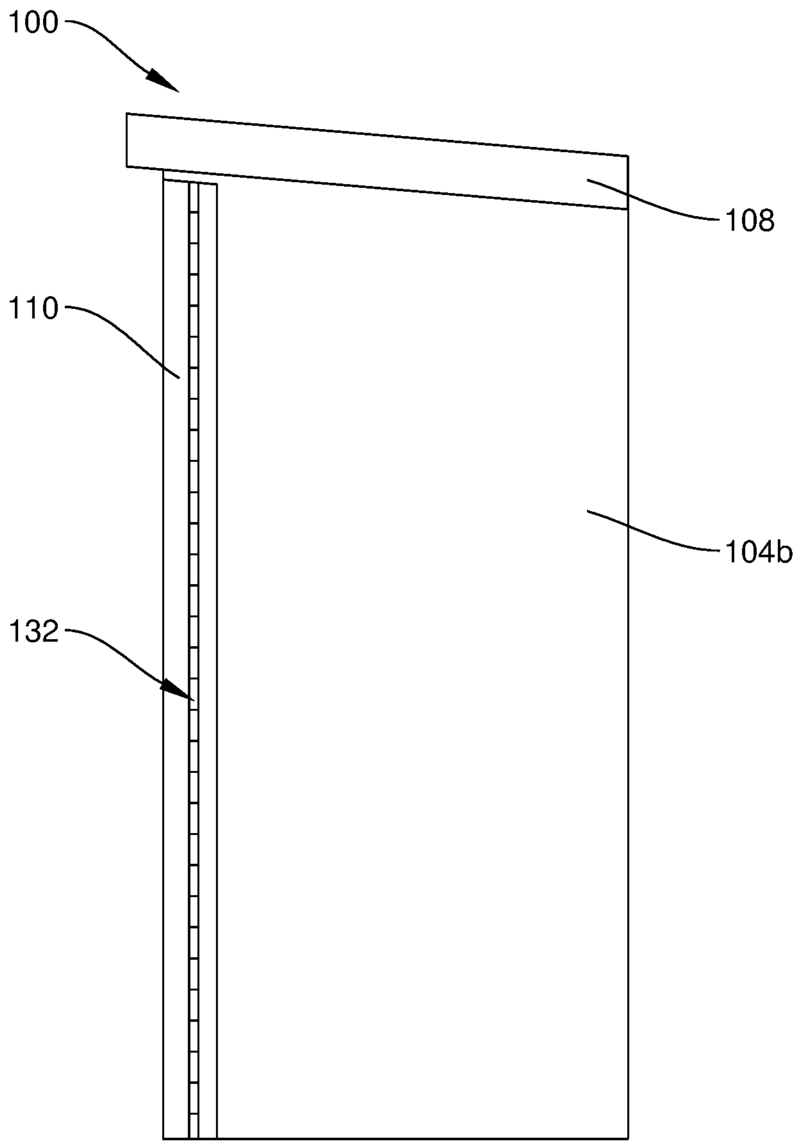
FIG. 5 illustrates a side view of the emergency response locker, according to an embodiment of the present invention.

FIG. 5 illustrates a side view of the emergency response kit 100 according to an embodiment of the present invention. The top roof 108 as shown here is structured to have a sloped profile, which facilitates easy drainage of water and prevents water stagnation during rain. The attachment means 132, illustrated here as a full-length piano hinge, which ensures a secure and smooth movement of door 110.

The emergency response kit 100, constructed in accordance with the present invention, is not only mountable on the surfaces such as walls, floors, or a substrate but can be carried anywhere with ease. The portability of the emergency response kit 100 makes it a viable option for keeping it in patrolling vehicles as well for use in case of an emergency.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Having thus described the invention in rather full detail, it will be understood that such detail need not be strictly adhered to, but that additional changes and modifications may suggest themselves to one skilled in the art, all falling within the scope of the invention as defined by the subjoined claims.

We claim:

1. An emergency response kit consisting of:

a. an enclosure for storage having an operational front open end and a rear closed end, the enclosure being defined by a base, lateral walls, a back wall, and a rooftop;

b. a door pivoted at the operational front end to one of the lateral walls using an attachment means that facilitates movement of the door between an open position and a closed position to selectively provide access to an inside of the enclosure, said door comprising a stainless steel handle attached to an exterior thereof, and said handle being configured to break off in response to application of excessive force caused by pulling hard on the handle to open the door, leaving the door locked in place but subject to being opened through the use of a biometric lock and/or eye retina scan lock;

c. a weather-resistive gasket sealing a peripheral edge of said open end of the enclosure;

d. emergency response equipment secured on an inside of the enclosure to at least one of said base, said rooftop, said back wall, and said lateral walls, said emergency response equipment consisting of breaching equipment, medical supplies, fire safety equipment, and one or more ballistic shields; and e. a locking mechanism for securing the door in said closed position to restrict access to the at least one emergency response equipment.

2. An emergency response locker, consisting of:

a. an enclosure for storage having an operational front open end and a rear closed end, the enclosure being defined by a base, lateral walls, a back wall and a roof top;

b. a door pivoted at said operational front end to one of the lateral walls using an attachment means that facilitates movement of the door between an open position and a closed position to selectively provide access to an inside of the enclosure;

c. a weather-resistive gasket sealing a peripheral edge of said open end of the enclosure;

d. a said rooftop having a sloped profile; and e. a locking mechanism for securing the door in said closed position to restrict access to interior portions of the locker, said locking mechanism comprising a handle attached to an exterior portion of the door and being configured to break off in response to application of excessive force caused by pulling hard on the handle to open the locker without a key or preselected code, leaving the door locked in place but subject to being opened through the use of said key and/or an appropriate code;

f. said locker containing emergency response equipment secured on an inside of the enclosure to at least one of said base, said rooftop, said back wall, and said lateral walls, said emergency response equipment consisting of breaching equipment, medical supplies, fire safety equipment, at least one noncombustible flashbang, and at least one ballistic shield.

3. An emergency response locker, as recited by claim 2, wherein said flashbang is a noncombustible tactical flash device.

* * * * *